United States Patent
Tran

(10) Patent No.: US 8,090,943 B1
(45) Date of Patent: Jan. 3, 2012

(54) PREVENTING UNAUTHORIZED ACCESS OF ROUTINES IN A LIBRARY

(75) Inventor: Hoa Thu Tran, Escondido, CA (US)

(73) Assignee: Teradata US, Inc., Dayton, OH (US)

( * ) Notice: Subject to any disclaimer, the term of this patent is extended or adjusted under 35 U.S.C. 154(b) by 1883 days.

(21) Appl. No.: 10/424,968

(22) Filed: Apr. 28, 2003

(51) Int. Cl.
*G06F 7/04* (2006.01)
*G06F 17/30* (2006.01)
*G06F 9/44* (2006.01)
*H04N 7/16* (2006.01)

(52) U.S. Cl. ........ 713/167; 717/164; 719/331; 707/781; 726/22; 726/27

(58) Field of Classification Search .................. 705/59
See application file for complete search history.

(56) References Cited

U.S. PATENT DOCUMENTS

| | | | |
|---|---|---|---|
| 5,375,241 A | 12/1994 | Walsh | 395/700 |
| 5,504,901 A * | 4/1996 | Peterson | 717/144 |
| 5,708,811 A * | 1/1998 | Arendt et al. | 717/163 |
| 5,970,245 A | 10/1999 | Poteat et al. | 395/704 |
| 5,974,549 A * | 10/1999 | Golan | 726/23 |
| 6,006,235 A * | 12/1999 | Macdonald et al. | 707/103 R |
| 6,141,698 A * | 10/2000 | Krishnan et al. | 719/331 |
| 6,230,312 B1 * | 5/2001 | Hunt | 717/108 |
| 6,330,691 B1 * | 12/2001 | Buzbee et al. | 714/35 |
| 6,336,148 B1 * | 1/2002 | Doong et al. | 719/316 |
| 6,499,137 B1 | 12/2002 | Hunt | 717/164 |
| 6,698,015 B1 * | 2/2004 | Moberg et al. | 717/154 |
| 6,708,330 B1 * | 3/2004 | Moberg et al. | 717/158 |
| 6,769,114 B2 * | 7/2004 | Leung | 717/124 |
| 6,934,943 B2 * | 8/2005 | Hundt et al. | 717/159 |
| 7,146,610 B2 * | 12/2006 | Shen | 717/170 |
| 2002/0138727 A1 * | 9/2002 | Dutta et al. | 713/167 |
| 2003/0051068 A1 * | 3/2003 | Eldridge et al. | 709/318 |
| 2003/0200449 A1 * | 10/2003 | Droege et al. | 713/189 |
| 2004/0025921 A1 * | 2/2004 | Garza et al. | 135/68 |
| 2004/0123270 A1 * | 6/2004 | Zhuang et al. | 717/118 |
| 2007/0204259 A1 * | 8/2007 | Wilner et al. | 717/124 |

* cited by examiner

*Primary Examiner* — Alicia Lewis
(74) *Attorney, Agent, or Firm* — Trop, Pruner & Hu P.C.; John D. Cowart

(57) ABSTRACT

A system, such as a database system, includes a shared library having plural routines. A linking procedure is used in which a routine (referred to as a "first routine") is linked to a stub library containing stub programs corresponding to other routines that the first routine is authorized to invoke. If no linking error occurs, the first routine is then linked to the shared library. In some implementations, the first routine is one of a user-defined method (UDM), user-defined function (UDF), or stored procedure created in response to a database query language (e.g., Structured Query Language or SQL) statement.

12 Claims, 3 Drawing Sheets

PREVENTING UNAUTHORIZED ACCESS OF ROUTINES IN A LIBRARY

BACKGROUND

A relational database is a collection of logically related data arranged as rows and columns in one or more tables (or relations). A conventional relational database management system (RDBMS) typically provides predefined simple data types, such as integers, real numbers, character strings, and so forth, for storing different types of data. To enhance flexibility in storing different types of data, user-defined data types (UDTs) have been introduced.

A UDT is associated with various user-defined methods, which are software routines or modules that can be created by database users or applications for performing various tasks with respect to data stored in tables. While user-defined methods are associated with UDTs, a user or application can also create a user-defined function (UDF) or a stored procedure that does not necessarily have to be associated with a UDT.

For improved performance and efficient administration, methods, functions, and other routines can be grouped in a shared library that is accessible by software applications in the database system. Examples of shared libraries include dynamic link libraries (DLLs) associated with Microsoft WINDOWS® operating systems, or shared objects associated with UNIX operating systems. Methods and/or functions associated with a given database can be grouped into one shared library.

Security concerns are raised as a result of grouping methods and/or functions into a shared library. Any given method or function in the shared library can call another method or function in the same shared library. An unauthorized user who is knowledgeable about the shared library structure of a database system may be able to gain access to a method or function that the user is not authorized to access by embedding a call to the method or function within another method or function that is part of the same shared library. This is particularly a concern where the unauthorized access of methods or functions enables access of sensitive information stored in tables, such as social security numbers, salaries, and so forth.

SUMMARY

In general, methods and apparatus are provided to prevent unauthorized access of methods, functions, and/or routines within a shared library. For example, this is accomplished with a linking procedure that includes linking a given routine to a stub library containing one or more stub programs corresponding to other routines that the given routine is authorized to invoke. The process further includes determining whether a linking error occurs in response to the linking to the stub library. If no linking error occurs, the given routine is linked to a shared library.

Other or alternative features will become more apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
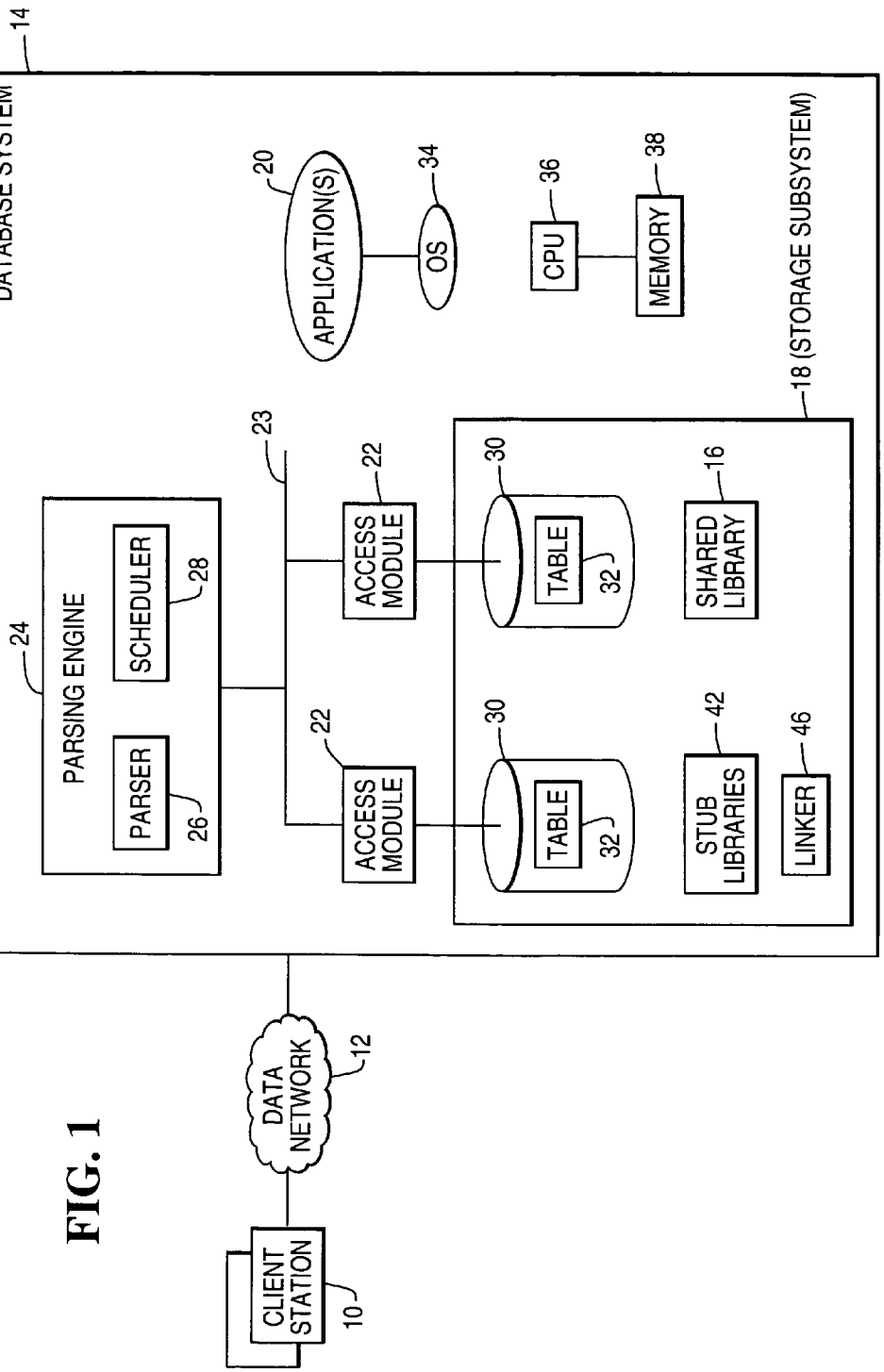
FIG. 1 is a block diagram of an example arrangement including a database system and client stations coupled to the database system.

FIG. 1 illustrates an example arrangement in which one or more client stations 10 are coupled over a data network 12 to a database system 14. Examples of the data network 12 include a local area network (LAN), a wide area network (WAN), and the Internet. Each of the client stations 10 is capable of issuing queries according to a standard database query language to the database system 14 to access or update data or to create or alter data structures (e.g., tables, rows, and so forth). One example of a standard database query language is the Structured Query Language (SQL), promulgated by the American National Standards Institute (ANSI).

A version of SQL that provides for user-defined data types (UDTs) is SQL:1999 (or SQL-99). SQL-99 also allows for the creation of user-defined methods (UDMs) and user-defined functions (UDFs). A UDM is associated with a UDT, while a UDF can be used with either UDTs or predefined simple data types (e.g., integers, real numbers, character strings, and so forth). A common feature of both UDMs and UDFs is that they are software routines created by a user to perform specified tasks. Another user-created routine is a stored procedure, which contains code to perform predefined capabilities. More generally, a UDM, UDF, stored procedure, or any other user-created routine is referred to as a "routine" in this discussion.

Multiple routines in the database system 14 are stored in one or more shared libraries, such as a shared library 16 shown in FIG. 1. The shared library 16 is stored in a storage subsystem 18. A benefit of using a shared library is that routines in the shared library can be shared by multiple software modules, such as the database application or other application(s) 20. The database application includes access modules 22 and one or more parsing engines 24 (as well as other modules not shown in FIG. 1).

Various criteria can be used to define how routines are grouped into respective shared libraries. For example, one criterion is that all routines associated with a particular database or schema is stored in one shared library. Another alternative criterion is that all routines associated with a particular UDT are grouped into a shared library.

The shared library 16 according to some embodiments is a dynamic link library (DLL), as provided by Microsoft WINDOWS® operating systems. Alternatively, the shared library 16 is a shared object as provided by UNIX operating systems. More generally, a "library" is a collection of software routines or modules that are grouped together. In one implementation, a library of multiple routines or modules is stored in a file. A "shared library" is a library that can be shared by plural software applications.

In one implementation, the shared library 16 is linked to a software module at run time. This means that the routines in the shared library 16 are not linked to the calling software module until the routines in the shared library are needed during execution of the calling software module, which enhances performance since the shared library is not loaded into memory until needed.

In the database system 14, the routines in the shared library 16 are called by the database application during processing of queries submitted by users or other applications. Generally, a query is received by the parsing engine 24 (such as from a client station 10 or from an application 20). The query is parsed by the parser 26, which generates executable steps. A scheduler 28 provides the executable steps to the access modules 22 over an interconnect layer 23. Each access module 22 performs the following tasks: inserts, deletes, or modifies contents of tables; creates, modifies, or deletes definitions of tables; retrieves information from definitions and tables; and locks databases and tables. In one example, the access modules 22 are based on access module processors (AMPs) used in some TERADATA® database systems from NCR Corporation. Each access module 22 manages access of data in respective storage modules 30 in the storage subsystem 18. The storage modules 30 store tables 32 and other data.

The database system 14 shown in FIG. 1 is an example of a parallel database system having plural processing units (in the form of the access modules 22 and the parsing engine 24). In another embodiment, instead of a parallel database system, a single-processor database system can be employed.

In addition to the components discussed above, the database system 14 according to some embodiments also includes an operating system 34, such as a WINDOWS® operating system, UNIX operating system, or some other type of operating system. The various software modules, including the database application, applications 20, and operating system 34, are executable on a central processing unit (CPU) 36, which is coupled to a system memory 38.

Generally, different users of the database system 14 are assigned different security levels. A table stored in the database system 14 can include relatively sensitive data (such as social security numbers, salary information, and so forth). Security levels are defined to enable some users to have access to such sensitive information, while denying access to such information to other users.

In some cases, routines, such as UDMs or UDFs, are used by the database application to access the different types of information stored in the table. For example, social security numbers can be accessed by a first routine, salary information can be accessed by another routine, while other types of data are accessed by other routines or by standard database queries. A security mechanism is implemented to enable certain users to have access to routines that are able to access sensitive information (such routines are referred to as "secure routines"). Thus, only users that are authorized to access sensitive information are given the right to invoke such secure routines.

However, if all routines associated with a given database are stored in one shared library, such as the shared library 16, then a user can gain unauthorized access to a secure routine by calling the secure routine from another routine in the same shared library, since routines that are part of the same shared library 16 are able to access each other. This creates a security hole that is addressed by some embodiments of the invention.

As an example, assume a table contains several columns, with one of them being a column containing social security numbers. Assume further that the information in the social security number column is accessible by a first routine (referred to as a "social security number routine"). Assume further that other information in the table is accessible by other routines (referred to as "general routines"). The routines are all stored in one shared library. User A is authorized to invoke all routines for accessing the table, while user B is authorized to invoke only the general routines but not the social security number routine. However user B can gain unauthorized access of the social security number routine by linking a second routine (which is one of the general routines) to the shared library, with the second routine containing a call to the social security number routine. User B can then call the second routine to gain unauthorized access of the social security number routine.

Figure 2:
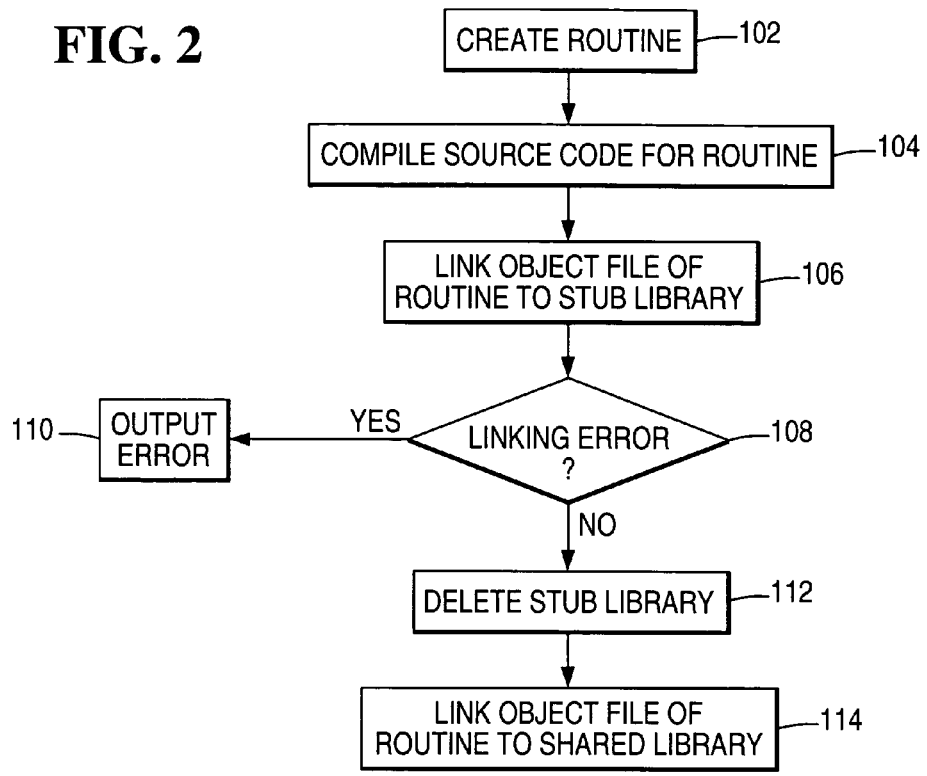
FIG. 2 is a flow diagram of a linking process according to one embodiment that can be performed in the database system of FIG. 1.

In accordance with some embodiments of the invention, to prevent such unauthorized access of routines in a shared library, a two-step linking procedure is employed, as shown in FIG. 2. First, a routine is created (at 102) by a user. This routine, which is written in software code (such as C code) is then compiled (at 104). For example, the compiling of the source code for the routine is performed in response to the following command:

compiler_name compiler_flags source_file, where compiler_name refers to the name of the compiler to be executed, compiler_flags refers to flags that are set by the user for various options associated with the compiler, and source_file refers to the file containing the source code for the routine. Compiling the source code generates an object file that is executable by the CPU 36 in the database system 14.

Next, instead of linking the object file for the routine directly to the shared library 16, the object file for the routine is first linked (at 106) by a linker 46 (FIG. 1) to a stub library 42 (FIG. 1). The stub library 42 is different from the shared library 16 in that the stub library contains only stub programs of routines that the routine being created is authorized or allowed to access. A stub program is a program that has the same name and associated parameters as a corresponding actual program, except that the stub program omits the code that is present in the body of the actual program.

Figure 3:
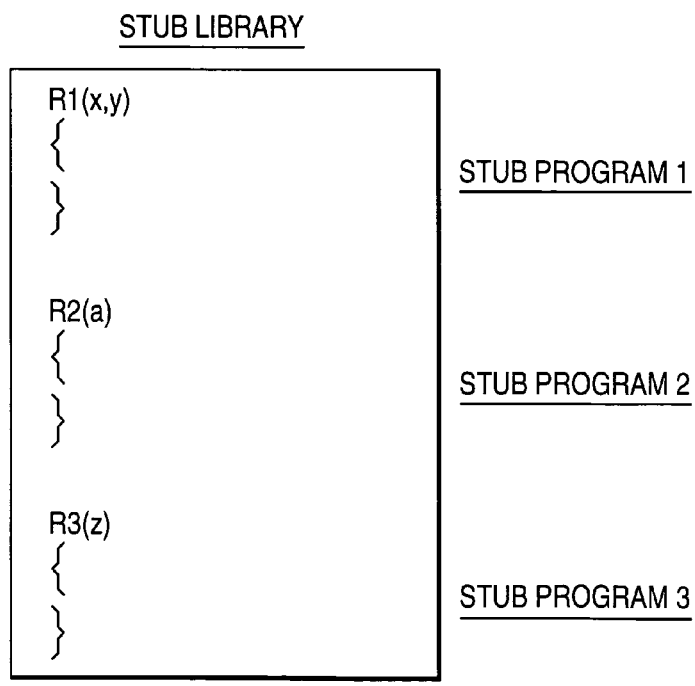
FIG. 3 illustrates a stub library having stub programs.

Thus, for example, if the routine being created has access to routines R1, R2, and R3, then the stub library 42 contains the stub programs corresponding to routines R1, R2, and R3, such as that shown in FIG. 3. Note that the content of each of stub programs R1, R2, and R3 is empty. If the routine being created does not call a routine other than routines R1, R2, and R3, then the link to the stub library 42 will produce a successful result. However, if the routine being created calls an unauthorized routine (other than routines R1, R2, and R3), then a link error will result.

The database system 14 next determines (at 108) if a link error has occurred. If so, then the error is output (at 110) to the user (such as displaying an error message). Because of the link error, the routine being created is not linked to the shared library 16. However, if no link error is detected (at 108), then the database system 14 deletes (at 112) the stub library 42. The linker 46 then links (at 114) the object file of the routine being created to the shared library 16.

This is repeated for each routine that is created, such that one stub library is associated for each such routine being created.

The following describes an example of the linking process for creating two routines: ROUTINE_A( ) and ROUTINE_B( ). Assume that each of the routines ROUTINE_A( ) and ROUTINE_B( ) calls a routine referred to as SCAN( ).

Figure 4:
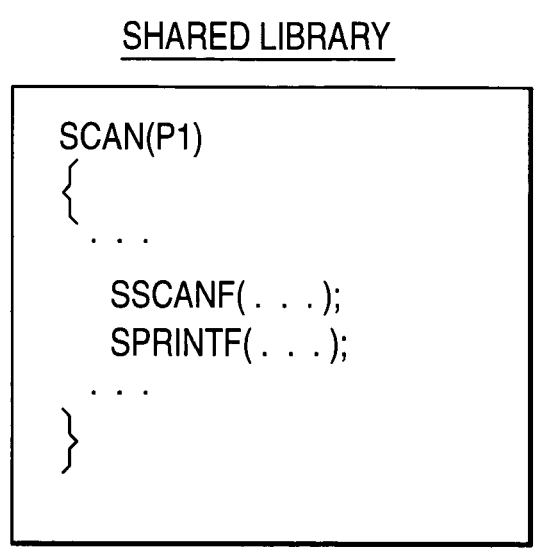
FIGS. 4 and 5 illustrate an example shared library and stub library.
Figure 5:
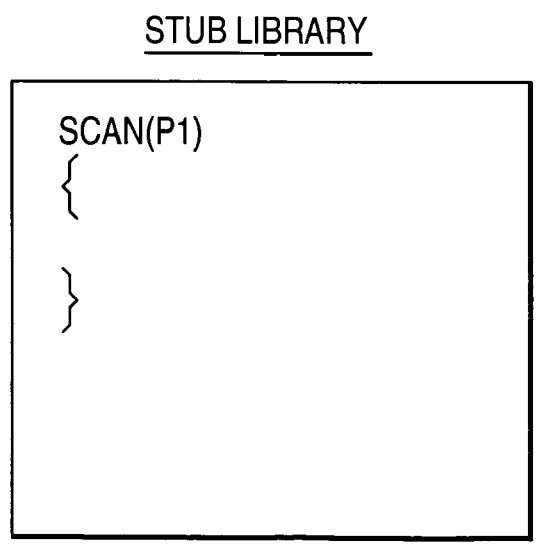

A real shared library that contains a SCAN( ) routine is shown in FIG. 4, while a stub library that contains a stub of the SCAN( ) routine is shown in FIG. 5. The code for a first example ROUTINE_A( ) is provided below:

ROUTINE_A(p1, p2)
{
a=SCAN(p1)
}

The source code for the example ROUTINE_B( ) is provided below:

```
ROUTINE_B(p1)
{
b=SCAN(p1)
}
```

Using the linking process shown in FIG. 2, the link of each of ROUTINE_A( ) and ROUTINE_B( ) to the stub library of FIG. 5 will produce a successful result, so that both routines ROUTINE_A( ) and ROUTINE_B( ) can be successfully linked to the shared library of FIG. 4.

However, in another scenario, another example ROUTINE_A( ) is provided below:

```
ROUTINE_A(p1,p2)
{
a=ROUTINE_B(p1)
return a*p2
}
```

The source code for ROUTINE_B( ) remains the same as the example above.

The link of ROUTINE_A(p1,p2) to the stub library shown in FIG. 5 will produce an error because the call to ROUTINE_B(p1) is unresolved, since the stub library shown in FIG. 5 does not contain a stub program for ROUTINE_B( ). As a result, the linking of ROUTINE_A( ) will fail.

In this manner, a routine containing an unauthorized call of a routine will be disabled from linking to the shared library, which protects against unauthorized access of information contained in tables of the database system.

Instructions of the various software routines or modules discussed herein (e.g., linker 46, database application, and so forth) are loaded for execution on corresponding control units or processors. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routine or modules) are stored in one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to the database system in one of many different ways. For example, code segments including instructions stored on floppy disks, CD or DVD media, a hard disk, or transported through a network interface card, modem, or other interface device are loaded into the device or system and executed as corresponding software modules or layers. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. An article comprising at least one storage medium containing instructions that when executed cause a system to:
   initiate a linking procedure of a first routine to a shared library that stores the first routine and at least one other routine that the first routine is not authorized to call, wherein the linking procedure links the first routine to a stub library containing stub programs corresponding to one or more routines that the first routine is authorized to access;
   conclude that the first routine contains a call to the other routine for which a stub program is not provided in the stub library; and
   in response to concluding that the first routine contains a call to the other routine for which a stub program is not provided in the stub library:
   indicate a linking error; and
   end the linking procedure without linking the first routine to the shared library.

2. The article of claim 1, wherein the system comprises a database system having a database application, and wherein concluding that the first routine contains a call to the other routine comprises concluding that a user-defined method or a user-defined function contains a call to the other routine, the user-defined method or user-defined function invocable by the database application.

3. The article of claim 2, wherein the instructions when executed cause the database system to invoke the user-defined method or user-defined function to access data contained in an attribute of a relational table.

4. The article of claim 1, wherein the system comprises a database system having a database application, and wherein concluding that the first routine contains a call to the other routine comprises concluding that a stored procedure contains a call to the other routine, the stored procedure invocable by the database application.

5. A computer-implemented method for use in managing executable routines in one or more storage devices, the method comprising:
   initiating a linking procedure of a first routine to a shared library that stores the first routine and at least one other routine that the first routine is not authorized to call, wherein the linking procedure links the first routine to a stub library containing stub programs corresponding to one or more routines that the first routine is authorized to access;
   concluding that the first routine contains a call to the other routine for which a stub program is not provided in the stub library; and
   in response to concluding that the first routine contains a call to the other routine for which a stub program is not provided in the stub library:
   indicating a linking error; and
   ending the linking procedure without linking the first routine to the shared library.

6. The method of claim 5, wherein concluding that the first routine contains a call to the other routine comprises concluding, for a database system having a database application, that a user-defined method or a user-defined function contains a call to the other routine, the user-defined method or user-defined function invocable by the database application.

7. The method of claim 6, further comprising invoking the user-defined method or user-defined function to access data contained in an attribute of a relational table.

8. The method of claim 5, wherein concluding that the first routine contains a call to the other routine comprises concluding, for a database system having a database application, that a stored procedure contains a call to the other routine, the stored procedure invocable by the database application.

9. A database system comprising:
one or more physical processors and one or machine-readable storage media that together implement:
a storage component comprising a shared library; and
a controller configured to:
initiate a linking procedure of a first routine to a shared library that stores the first routine and at least one other routine that the first routine is not authorized to call, wherein the linking procedure links the first routine to a stub library containing stub programs corresponding to one or more routines that the first routine is authorized to access;
conclude that the first routine contains a call to the other routine for which a stub program is not provided in the stub library; and
in response to concluding that the first routine contains a call to the other routine for which a stub program is not provided in the stub library:
indicate a linking error; and
end the linking procedure without linking the first routine to the shared library.

10. The system of claim 9, wherein the controller, in concluding that the first routine contains a call to the other routine, is configured to conclude that a user-defined method or a user-defined function contains a call to the other routine, the user-defined method or user-defined function invocable by a database application that accesses the database system.

11. The system of claim 9, wherein the controller is configured to invoke the user-defined method or user-defined function to access data contained in an attribute of a relational table.

12. The system of claim 9, wherein the controller, in concluding that the first routine contains a call to the other routine, is configured to conclude that a stored procedure contains a call to the other routine, the stored procedure invocable by a database application that accesses the database system.

* * * * *